(12) United States Patent
Young, III (10) Patent No.: US 12,250,610 B1
(45) Date of Patent: Mar. 11, 2025

(54) LOCATION BASED REMINDER PROMPTING

(71) Applicant: Walter Michael Young, III, Hatfield, PA (US)

(72) Inventor: Walter Michael Young, III, Hatfield, PA (US)

( * ) Notice: Subject to any disclaimer, the term of this patent is extended or adjusted under 35 U.S.C. 154(b) by 0 days.

(21) Appl. No.: 18/132,397

(22) Filed: Apr. 9, 2023

Related U.S. Application Data (63) Continuation of application No. 17/740,875, filed on May 10, 2022, now abandoned, which is a continuation-in-part of application No. 17/090,535, filed on Nov. 5, 2020, now abandoned, which is a continuation-in-part of application No. 16/195,740, filed on Nov. 19, 2018, now abandoned, which is a continuation-in-part of application No. 15/454,776, filed on Mar. 9, 2017, now abandoned.

(51) Int. Cl.
  *H04W 4/02* (2018.01)
  *G06Q 10/1093* (2023.01)
  *G06Q 50/00* (2012.01)

(52) U.S. Cl.
  CPC ........ *H04W 4/023* (2013.01); *G06Q 10/1097* (2013.01); *G06Q 50/01* (2013.01)

(58) Field of Classification Search
  CPC ....... H04W 4/029; H04W 4/02; H04W 4/021; H04W 4/023; H04W 4/028; H04W 4/12; H04W 4/022; H04W 4/22; H04W 4/043; H04W 4/80; H04W 4/21; H04W 68/04; H04W 4/025; G06K 9/00255; G06K 9/00671; G06K 2009/00738; G06Q 10/0833; G06Q 50/01; G06Q 10/1097; G06Q 30/0267; G06Q 30/0261; G06Q 30/0259; G06Q 10/0832; G06Q 10/08355; G06Q 10/0835
  See application file for complete search history.

(56) References Cited

U.S. PATENT DOCUMENTS

| | | | | |
|---|---|---|---|---|
| 2004/0203847 | A1* | 10/2004 | Knauerhase | G06Q 10/06 455/457 |
| 2010/0037292 | A1* | 2/2010 | Light | H04L 63/20 709/224 |
| 2016/0335709 | A1* | 11/2016 | Salvatore | H04W 4/029 |
| 2018/0158132 | A1* | 6/2018 | Salvatore | G06Q 30/0633 |
| 2018/0322519 | A1* | 11/2018 | Goecke | H04M 1/72403 |
| 2019/0361463 | A1* | 11/2019 | Nelson | G06F 16/9537 |

* cited by examiner

Primary Examiner — Allahyar Kasraian
(74) Attorney, Agent, or Firm — Gugliotta & Gugliotta, LPA (57) ABSTRACT

A location and product based task reminder is provided to p rompt a user's mobile handset a product based task reminder based upon proximity of the user's mobile handset relative to a task facilitation location. A task reminder system is provide in which reminders are based upon proximity of the user's mobile handset relative to a task facilitation location.

4 Claims, 6 Drawing Sheets

LOCATION BASED REMINDER PROMPTING

RELATED APPLICATIONS

The present invention is a Continuation in Part of U.S. Ser. No. 17/740,875, filed on 10 May 2022, which is a Continuation in Part of U.S. Ser. No. 15/454,776, filed on 9 Mar. 2017 and U.S. Ser. No. 16/195,740, filed on 19 Nov. 2018, and U.S. Ser. No. 17/090,535 filed on 5 Nov. 2020, all incorporated by reference as if fully rewritten herein.

BACKGROUND OF THE INVENTION

1. Field of the Invention

The present invention relates to a system and method for providing product based task reminder prompt through a user's mobile handset and, more particularly, to such a system and method that initiates such task reminders based upon proximity of the user's mobile handset relative to a task facilitation location.

2. Description of the Related Art

A location-based service (LBS) is a software-level service that uses location data to control features. As such LBS is an information service and has a number of uses in social networking today as information, in entertainment or security, which is accessible with mobile devices through the mobile network and which uses information on the geographical position of the mobile device, Similarly, geo-social networking is a type of social networking in which geographic services and capabilities such as geo-coding and geo-tagging are used to enable additional social dynamics. User-submitted location data or geo-location techniques can allow social networks to connect and coordinate users with local people or events that match their interests. Geo-location on web-based social network services can be IP-based or use hotspot trilateration. For mobile social networks, texted location information or mobile phone tracking can enable location-based services to enrich social networking.

Such services for mobile communication devices utilizing such concepts include Foursquare™ and Brightkite™. Foursquare™ is a local search-and-discovery service mobile app which provides personalize recommendations of places to go near a user's current location based upon a user's previous browser history, purchases or check-in history. Brightkite™ was a location-based social networking website where users were able to 'check in "at places by using text messaging or one of the mobile applications, and allow a user to see who is nearby and who has been there before.

The components for such location-as-platform technology thereby already exist to allow a user to interact with their environment. All that is needed is a coherent and targeted design objective, and a comprehensive system and method for implementing the same.

Various other websites, mobile communication device apps, or other systems also exist for creating reminder lists or task list. However, to date such electronic systems have only been capable of triggering an event reminder based upon calendars, clocks, timers or the like.

Consequently, a need exists for providing a geo-location enabled reminders of previously initiated tasks based upon the proximity of the user's location relative to a secondary location that has relevance to facilitating the completion of such a task.

SUMMARY OF THE INVENTION

It is thus an object of the present invention to provide a method for providing product based task reminder prompts through a user's mobile handset.

It is another object of the present invention to provide a system for implementing such a method.

It is yet another object of the present invention to provide such a system and method that initiates a task reminders based upon the location of a user's mobile handset in relative proximity to a task facilitation location.

Briefly according to the preferred embodiment of the present invention, a product based task reminder system is provide in which reminders are based upon proximity of the user's mobile handset relative to a task facilitation location. According to a first aspect of the invention, a consumer-to-consumer or peer-to-peer method is provided to allow a product based task reminder to be triggered based upon a user's proximity to the location of another targeted individual that is the basis of the reminder. When the user sets a reminder to action based upon a peer location based trigger, such as, for example, "remind me next time I see Brian to . . . ", then the system will record the delivery of the reminder action based upon the location of the user's mobile cellular device relative to the location of the target peer's mobile cellular device.

According to an alternate variation of this aspect, the target peer's address may be used to trigger the delivery of the reminder action. According to such an aspect, a reminder text, pop-up or alarm is thereby generated on the user's mobile cellular device once the device location is within a selected geographic proximity range to the target.

According to another aspect of the present invention, a consumer-to-business or client-server method is provided to allow a product based task reminder to be triggered based upon a user's proximity to the location of a targeted commercial facility. When the user sets a reminder to action based upon a commercial facility location based trigger, such as, for example, "remind me next time I am at Walmart® to pick up some . . . ", then the system will record the delivery of the reminder action based upon the location of the user's mobile cellular device relative to the location of the target commercial location or store based upon identification of the commercial location's wi-fi presence. According to an alternate variation of this aspect, the target commercial location or store's address may be used to trigger the delivery of the reminder action. According to such an aspect, a reminder text, pop-up or alarm is thereby generated on the user's mobile cellular device once that device location detects the targeted wi-fi access point or is within a selected geographic proximity range to the target address.

According to an alternate aspect of the present invention, data from the other various aspects may be used to generate content consistent but location alternative options for completing the designated task. By way of example, and not meant as a limitation, if a user sets a reminder to "purchase light bulbs the next time I am at Walmart®", a task completion option may be generated when the user is at HomeDepo® such as, for example, " . . . light bulbs are available at this store in aisle 3, and the nearest WalMart® is 1.2 miles away. Do you want to purchase them here?".

In any embodiment, contacts in a mobile communication device are identified in a manner to trigger delivery of a preset reminder by taking into account different factors including, the current context, using information from user's contacts, current time, location, information from available navigational tools including GPS running on the user's phone, and other publicly available information. Embodiments may further provide a texts, alarms, messages or other audible and/or visual reminders of prioritized list of suggested people to contact or places to visit in order to allow the user to complete a predetermined task. Termination of the task can be initiated by engaging one or more buttons or by touching the screen, or through voice commands on a mobile communication device.

It is an advantage of the present invention relates to provide a method for providing product based task reminder prompts through a user's mobile handset.

It is another advantage of the present invention to provide a system for implementing such a method.

It is yet another advantage of the present invention to provide such a system and method that initiates a task reminders based upon the location of a user's mobile handset in relative proximity to a task facilitation location.

It is yet a further advantage of the present invention to provide alarms or reminders based upon location based data to allow for prompting action by a user only when the user is in a geographic location that would allow for easy completion of such a prompted action. Such location based reminders can provide a time efficiency to the completion of errands and tasks.

Further still, a method for delivering a reminder or alert on a mobile communication device assists users in finding and purchasing a specific product by using a database of retail business locations and inventory listings. This method simplifies the process of completing tasks and reminders that involve purchasing products.

These and other advantages and features of the present invention are described with specificity so as to make the present invention understandable to one of ordinary skill in the art. Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. DETAILED DESCRIPTION OF THE FIGURES

Figure 1:
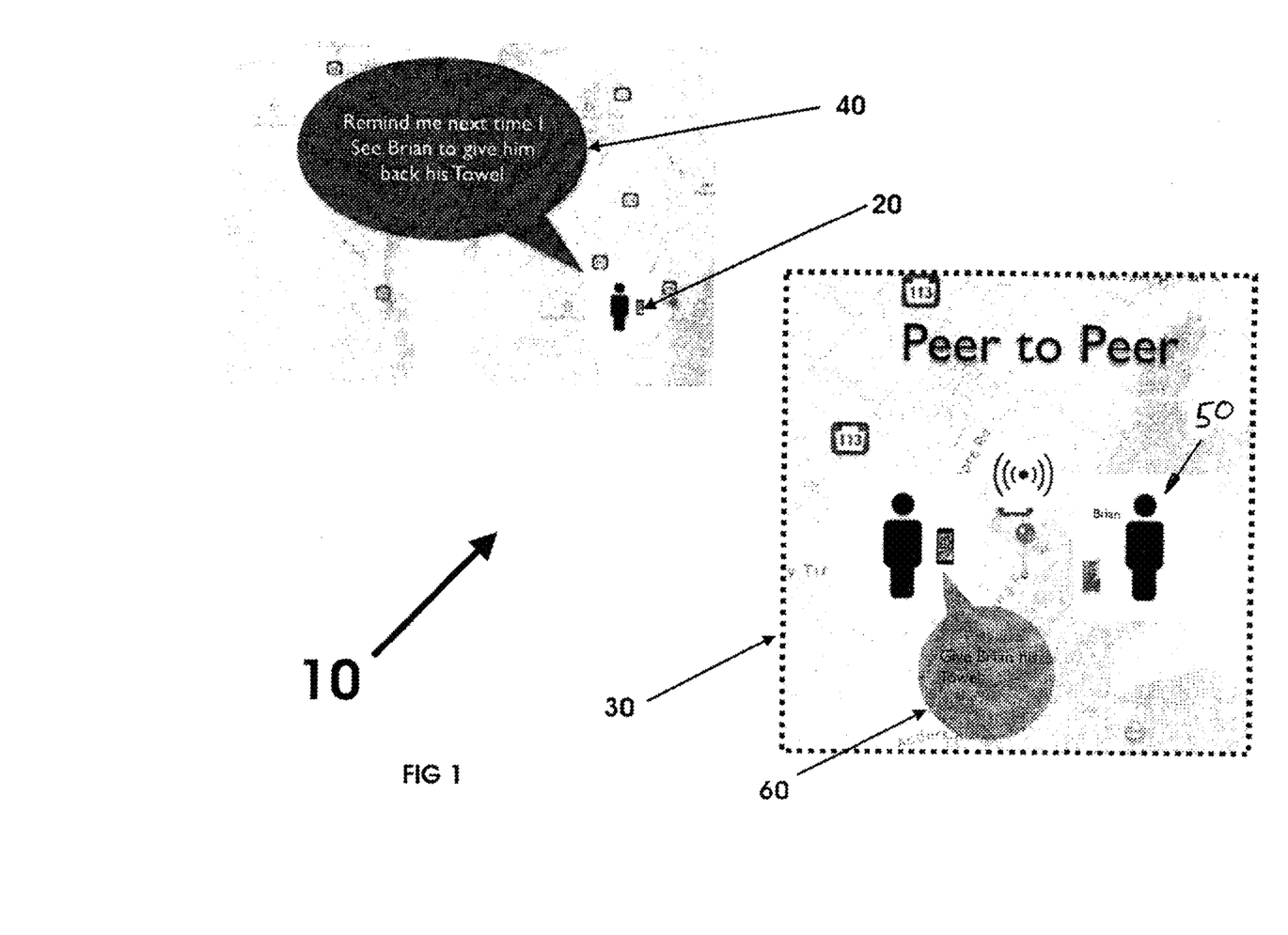
FIG. 1 depicts a conceptual diagram of the present invention illustrating a system for location based reminder prompting in a mobile communication device according to a first preferred embodiment of the present invention.

Referring now to the drawings, wherein like reference numerals indicate the same parts throughout the several views, of a mobile telephone enabled task reminder is shown for use in the present invention is shown in its general environment in FIG. 1. A task reminder system, generally noted as 10, is provide in which reminders are based upon proximity of the user's mobile handset 20 relative to a task facilitation location 30. For purpose of the present invention, a "task" is to be broadly construed as being any instruction, direction, list, reminder, information, data or similar or equivalent other content that may be use to facilitate any of the features, advantages, object or benefits described herein or anticipated thereby. In a consumer-to-consumer or peer-to-peer usage, a task reminder 40 to be triggered based upon a user's proximity to the location 30 of another targeted individual 50 that is the basis of the reminder.

As shown in the current FIG. 1, meant merely as an example and not intended to be a limitation, the user sets a reminder 40, shown herein as "remind me next time I see Brian to give him back his towel". Based on this reminder 40, a call to action 60 is generated based upon a proximity of the user's mobile communication device relative to an intended target 50, herein shown as being in a predetermined proximity 30 of the intended target 50, herein shown as "Brian", the subject of the intended task. Such location based trigger 60, such as, for example, "Give Brian his towel", can then be delivered to the user's mobile communication device 20 only when the user is near the intended target of the task.

According to a variation of the above embodiment, a reverse peer-to-peer reminder may be initiated it which a user enters a location specific task to a designated target. By way of example, and not as a limitation, using the above example a trigger such as "Have Brian pick up his towel the next time he is over" can be populated and initiated on a third party user's mobile communication device.

As shown and described, the task reminder is triggered relative to the location of the target peer's mobile cellular device. It is further intended in an alternate variation of this aspect that an identifier linking the product based task reminder be used to provide a target consisting of a contact stored address or a physical address geo-location of the target peer's address may be used as the detected proximity 30 to trigger the delivery of the reminder action.

In either aspect, the reminder 60 in the form of a text, pop-up, alarm or any broadly construed functional equivalent 60 is thereby generated on the user's mobile cellular device 20 once the device location is within a selected geographic proximity range 30 to the target 50.

Figure 2:
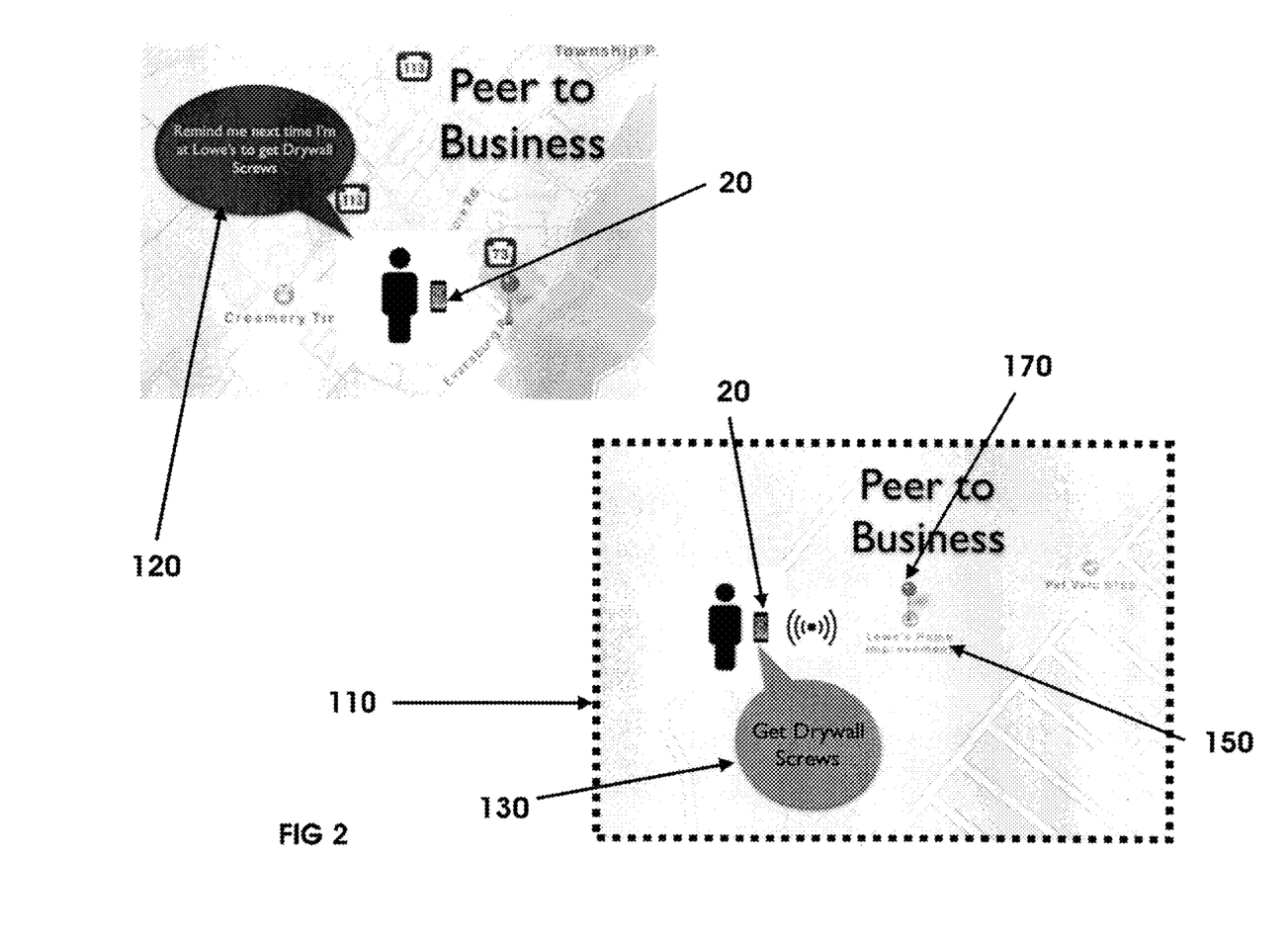
FIG. 2 depicts a conceptual diagram of the present invention according to a first alternate embodiment thereof.

As further shown in conjunction with FIG. 2, another aspect of the present invention is depicted as a consumer-to-business or client-server method, generally noted as 100, to allow a the task reminder to be triggered based upon a user's proximity to the location of a targeted commercial facility. The task reminder system 100 provides reminders based upon proximity of the user's mobile handset 20 relative to a task facilitation location 110. In a consumer-to-business usage, a task reminder 120 to be triggered is based upon a user's proximity to the location 110 of a commercial facility location based trigger.

As shown in the current FIG. 2, meant merely as an example and not intended to be a limitation, the user sets a reminder 120, shown herein as "remind me next time I am at Walmart® to get light bulbs". Based on this reminder 120, a call to action 130 is generated based upon a proximity of the user's mobile communication device 20 relative to an intended target 150, herein shown as being in a predetermined proximity 110 of the intended target 150, herein shown as "WalMart®", the subject of the intended task. Such proximity-based trigger 130 can then be delivered to the user's mobile communication device 20 only when the user is near the intended target 150 of the task. In short, the proximity of the user of the mobile communication device to a facility in which the intended task can be accomplished, is what triggers the reminder or task the user previously set on his mobile communication device. In this example, the location of a "WalMart® may be delivered to the mobile communication device from publicly available information from online directories where the mobile communication device has internet connectivity. Additionally, the location of a "WalMart® may be delivered to the mobile communication device from a navigational tool accessible by the mobile communication device. The key aspect of the subject invention is that the user's proximity to a facility, identified by its standard industrial classification (SIC Code), where a product (identified by its uniform product code or UPC Code) can be purchased, and can thus satisfy a task or reminder set by the user, is what drives the invention. By comparing the target product a list of items being sold various retail locations, and identifying a nearby retail business from a list of the various retail locations, the reminder can be generated. No other reminder and/or location app is driven by the unique feature.

Figure 3:
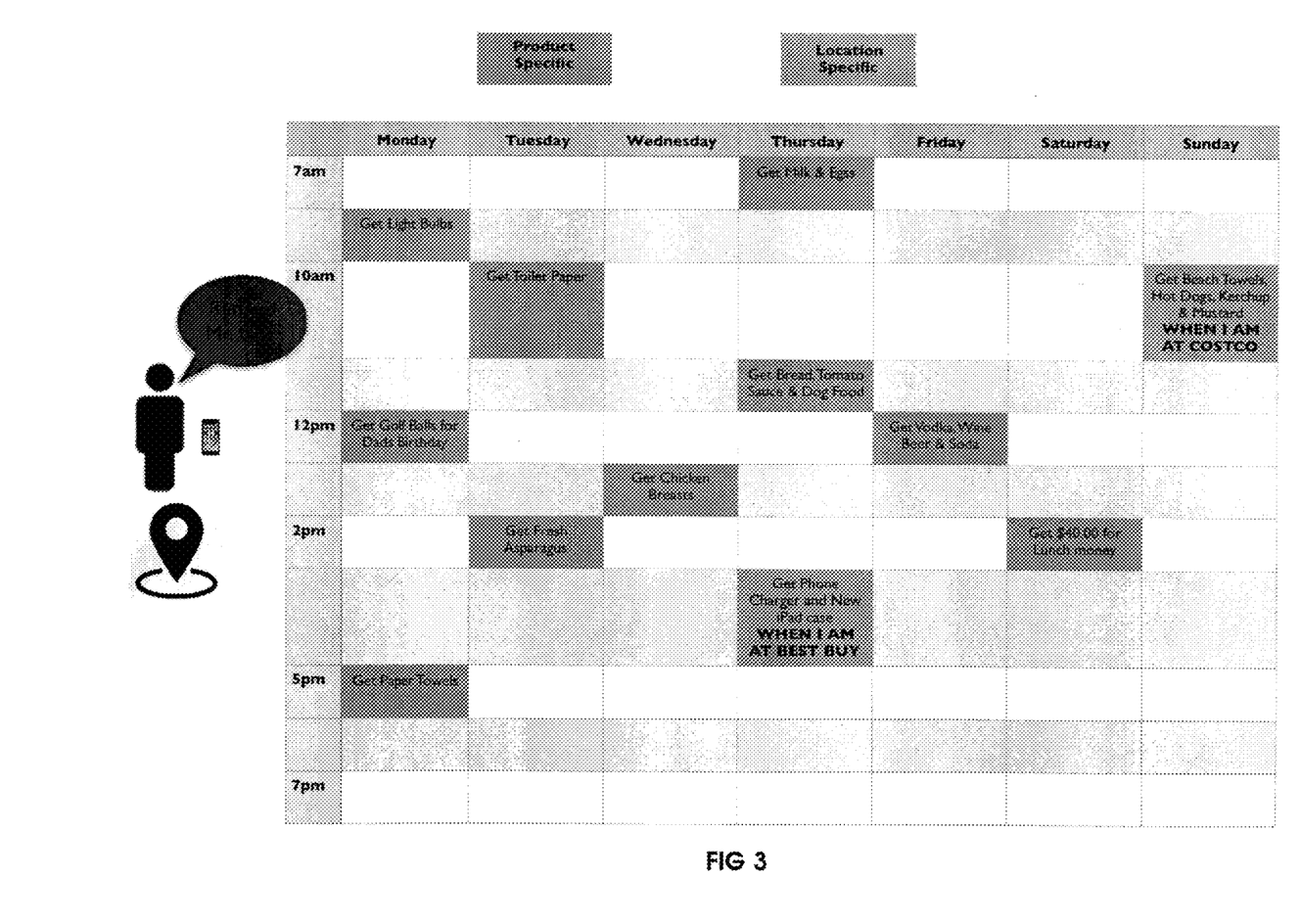
FIG. 3 is a graphical representation of a typical calendar populated with both product specific reminders as well as location specific reminders.
Figure 4:
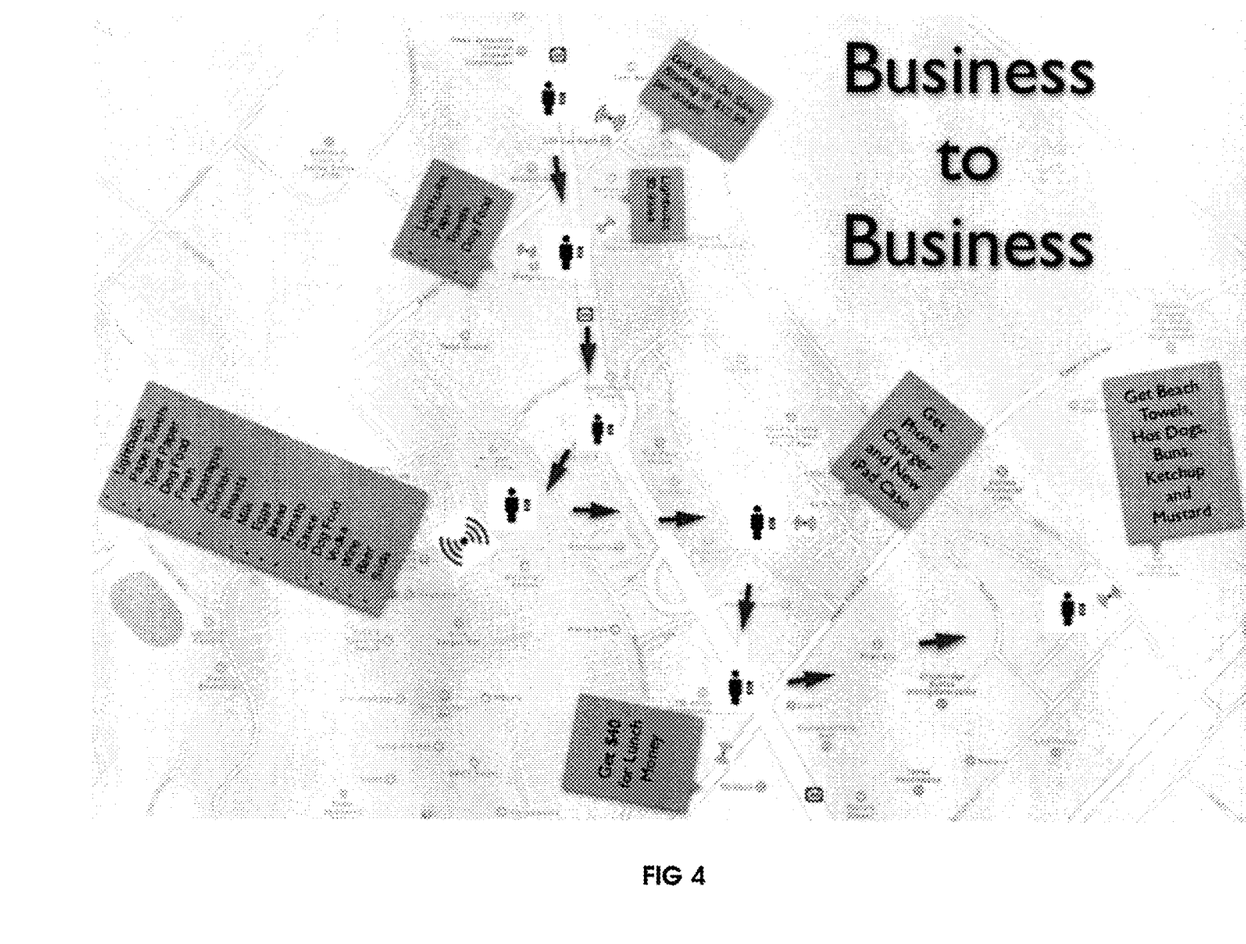
FIG. 4 is a graphical representation of the operation of the present system showing task reminder prompts being initiated in proximity to specific task completion locations.

As shown and described in FIG. 3 and FIG. 4, the task reminder 130 is triggered relative to the location of the target peer's mobile cellular device 20. An identifier linking the product based task reminder may be used to provide a contact stored address or a physical address geo-location of the target peer's address. It is further intended in an alternate variation of this aspect that the target's 150 address 170 may be used as the detected proximity to trigger the delivery of the reminder action 130.

In any aspect, the reminder in the form of a text, pop-up, alarm or any broadly construed functional equivalent 130 is thereby generated on the user's mobile cellular device 20 once the device location is within a selected geographic proximity range 110 to the target 150.

In any embodiment, contacts in a mobile communication device or addresses from public sources are identified in a manner to trigger delivery of a preset reminder by taking into account different factors including, the current context, using information from user's contacts, current time, location, information from available navigational tools including GPS running on the user's phone, and other publicly available information. Embodiments may further provide a texts, alarms, messages or other audible and/or visual reminders of prioritized list of suggested people to contact or places to visit in order to allow the user to complete a predetermined task. Termination of the task can be initiated by engaging one or more buttons or by touching the screen, or through voice commands on a mobile communication device.

2. Operation of the Preferred Embodiment

In operation the present invention creates a method for delivering a reminder or alert on a mobile communication device. The method includes several steps that are essential to the process.

The first step involves creating a product-based task reminder on the mobile communication device that will generate an alert for later delivery. This reminder can be created by the user or generated automatically by the device. The second step involves creating a database of retail business locations. Each retail business has an inventory listing of products available at their location, which is associated with the business. This inventory database can be accessed by the mobile communication device and includes details such as opening hours, contact details, and directions for each retail location. The third step involves creating an identifier that links the product-based task reminder to a target product. The target product is related to a product in the inventory listing of products available at a retail business. The identifier also links the product to a facility from the database through may include machine-readable codes such as barcodes or QR codes associated with the products located at those retail business locations where the product can be purchased by the user to satisfy a pre-ordained task or reminder. This linking process ensures that the user can easily find and purchase the product they need. The fourth step involves continuously monitoring the first location of the mobile communication device and comparing it to the second location, which is the physical address geo-location of a nearby retail business. The mobile communication device can use GPS or other location-based technologies to determine its location. The fifth step involves comparing the target product to the items in the inventory listing of products available at the nearby retail business from the database. This comparison ensures that the user can purchase the required product at the nearest available location.

Finally, when the target product corresponds with a geo-location of the mobile communication device and the nearby retail business is within a set proximity, the method transmits the alert to the mobile communication device. This alert prompts the user to purchase the required product from the nearby retail business and can include information about the retail business location, target product, and price. The set proximity for triggering the alert is adjustable by the user. Additionally, the alert may include a discount or promotion code to incentivize the user to make the purchase.

Figure 5:
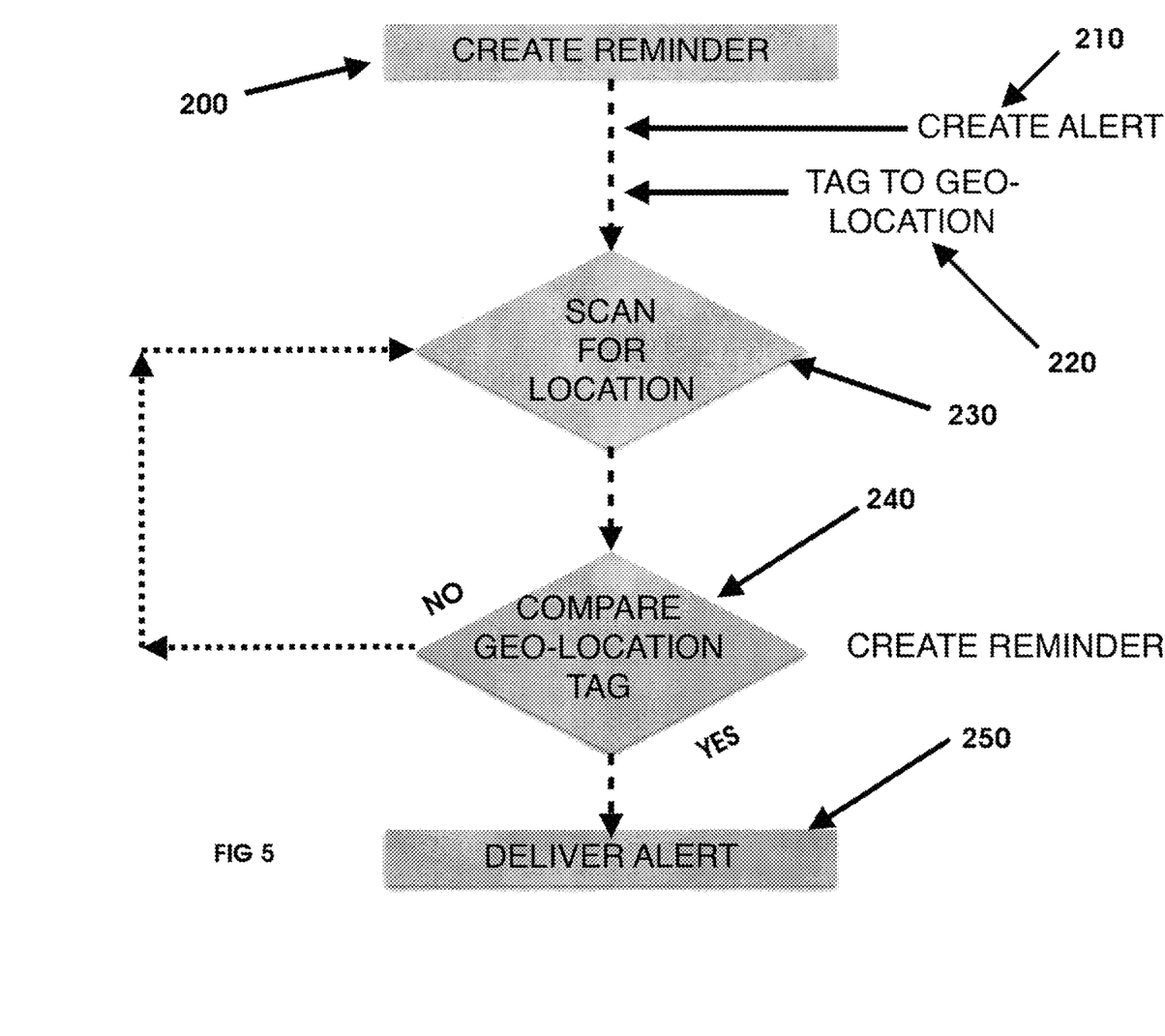
FIG. 5 is a flow chart illustrating a method for the location based prompting of task reminders delivered to a mobile communication device.

FIG. 5 is a flow chart illustrating this method for the location based prompting of task reminders delivered to a mobile communication device. In any embodiment, a user of the mobile communication device may create a task reminder on the mobile communication 200, which in turn creates an alert 210 for later delivery as well as a tag to a contact or physical address geo-location 220. An identifier is created linking a product based task reminder to a target related to the alert consisting of a contact stored address or a physical address geo-location. Based on context of the user's alert 210, information obtained from a plurality of information sources or the mobile communication device or both, an appropriate geo-location can be scanned 230 continuously to compare 240 the target geo-location to a geo-location of the user's own mobile communication device. If a comparison of the two locations is outside a set proximity, the scanning 230 will continue. If, however, the user's own mobile communication device is identified to be within a set proximity of the target geo-location, the created alert 210 is then delivered 250 to the user's mobile communication device. The mobile communication device tracks the purchase history of the user and generates personalized recommendations for products to purchase based on their past buying behavior. It also integrates with a virtual assistant or chatbot to provide a conversational interface for users to interact with the system and make purchases.

Embodiments may serve to suggest appropriate locations for proximity comparison may be based upon the information received from different sources. Such source should be broadly anticipated to be within the overall range of equivalents of the present innovation if it facilitates the determination of a user's proximity in relation to an identified or calculated target.

Figure 6:
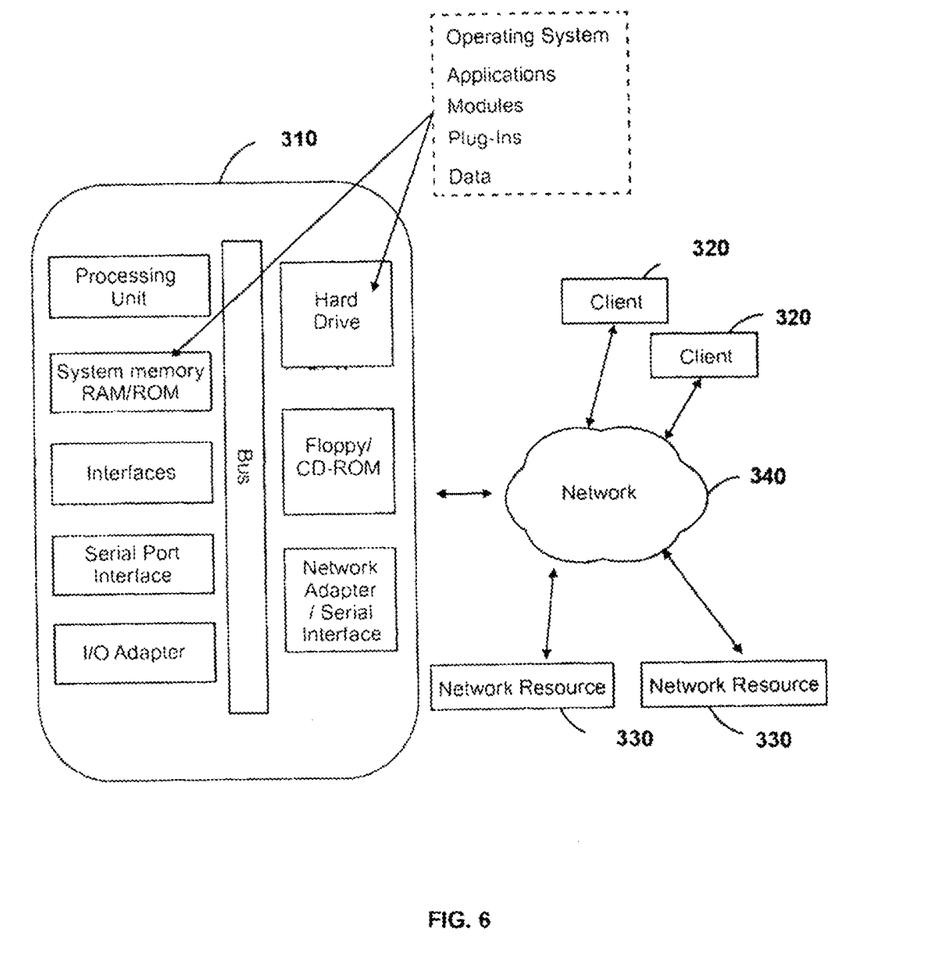
FIG. 6 is a schematic of a system employing a mobile communication device in communication with network resources over a network in accord with present embodiments.

FIG. 6 is a schematic of a system employing a mobile communication device in communication with network resources over a network in accord with the present embodiments. As can be seen, the system 300 contains a Mobile Communication Device 310, Clients 320, Network Resources 330, and a Network 340. The Mobile Communication Device 310 may contains a processing unit, system memory, Interfaces, a Serial Port Interface, an I/O adapter, a hard drive, a floppy drive, and a network serial adapter or their functional equivalents. Each of these may be connected with and communicate over the bus. Stored on the hard drive and the system memory may be various software modules and code which include an operating system, applications, modules, various plug-ins and data. The Mobile Communication Device (MCD) 310 may be a cellular telephone, a personal tablet computer or other similar portable device. This MCD 310 may contain stored code, which when executed by the processor unit may carry out embodiments or portions of embodiments as described herein. The MCD 310 may communicate over the Network 340 to gather and receive information from Network Resources 330. The clients 320 may also be MCDs and may be in communication with the MCD 310 of FIG. 6. The clients 320 may contain some or all of the components and software code of the MCD 310 shown in FIG. 6.

In operations, a reminder or alert may be generated and deployed through mobile communication device and network. Product based task reminder are created for later delivery, and are deployed in conjunction with one or more databases of retail business locations wherein inventory listings of products available at each retail business is associated with the retail business. An identifier is created linking the product based task reminder to a target product related to a product within the inventory listing of products and an identifier linking the product a facility from the database of retail business locations where the product can be purchased by the user to satisfy a pre-ordained task and/or reminder. By continuously monitoring the location of the mobile communication device, the location may be compared to the physical address geo-locations of retail business near the mobile communication device locations. By comparing the target product to items in the inventory listing of products available at the nearby retail business from the database, when a target product corresponds with a geo-location of the mobile communication device and the nearby retail business are within a set proximity, the alert may be transmitted to the mobile communication device to activate the reminder.

While embodiments have been described in terms of a system, method and device, other embodiments are also possible. Further, while embodiments have been described in terms of methods for prioritizing the suggested contacts in the mobile communication device itself, other embodiments and functionality may also be possible. For example, some of the suggested contacts in each situation may be stored in a local storage or network for future comparison. Additionally, while embodiments have been described in terms of methods for prioritizing the suggested contacts in the mobile communication device, other embodiments may also be possible. For example, the prioritized list of suggested contacts may also or instead allow for a reorganizing by the user of the mobile communication device.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A method for delivering a reminder or alert in a mobile communication device, the method consisting essential of the steps of:
    creating a product based task reminder on the mobile communication device which further creates an alert for later delivery;
    creating a database of retail business locations wherein an inventory listing of products available at each retail business is associated with the retail business;
    creating an identifier linking the product based task reminder to a target product related to a product within the inventory listing of products and an identifier linking the product a facility from the database of retail business locations where the product can be purchased by the user to satisfy a pre-ordained task and/or reminder;
    continuously monitoring a first location for the mobile communication device and comparing to a second location for a physical address geo-location of a nearby retail business;
    comparing the target product to items in the inventory listing of products available at the nearby retail business from the database; and
    when said target product corresponds with a geo-location of the mobile communication device and the nearby retail business are within a set proximity, transmitting said alert to the mobile communication device.

2. The method of claim 1, wherein information of said set proximity is sent over a network to the mobile communication device from a first information service, the information being processed to identify a geo-location of one or more contact at the mobile communication device.

3. The method of claim 1, wherein the mobile communication device has an internet connectivity for obtaining a user's current context, the context including publicly available information from online directories or current location of the mobile communication device obtained from a navigational tool.

4. The method of claim 2 wherein the mobile communication device has an internet connectivity for obtaining a user's current context, the context including publicly available information from online directories or current location of the mobile communication device obtained from a navigational tool.

* * * * *